Patented Aug. 4, 1942

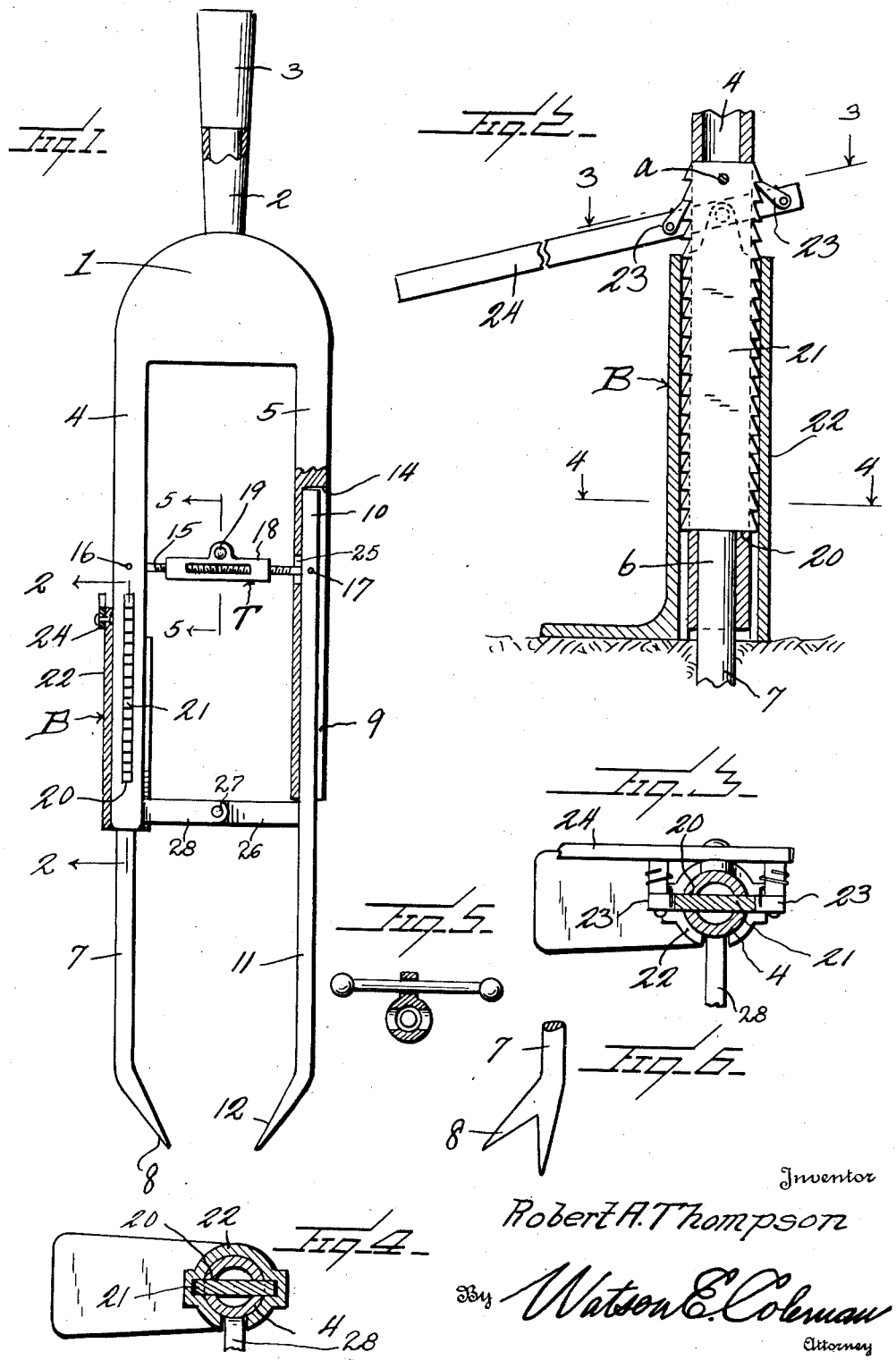

2,291,994

UNITED STATES PATENT OFFICE 2,291,994

LIFTER FOR WEEDS

Robert A. Thompson, Pampa, Tex.

Application May 1, 1941, Serial No. 391,430

6 Claims. (Cl. 294—50.6)

This invention relates to a lifter for weeds, such as dandelions or other weeds having a long root and it is an object of the invention to provide a device of this kind which is intended to cut or break the root of the plant at a material depth.

It is also an object of the invention to provide a device of this kind especially designed for use in connection with lawns that are sodded with Bermuda grass which creates a turf that is difficult to dig through with the average tool.

The invention consists in the details of construction and in the combination and arrangement of the several parts of my improved lifter for weeds whereby certain important advantages are attained, as will be hereinafter more fully set forth.

In order that my invention may be the better understood, I will now proceed to describe the same with reference to the accompanying drawing, wherein:

Figure 1 is a view in elevation with portions broken away of a lifter for weds constructed in accordance with an embodiment of my invention.

Figure 2 is an enlarged detailed sectional view taken substantially on the line 2—2 of Figure 1.

Figure 3 is a detailed sectional view taken substantially on the line 3—3 of Figure 2.

Figure 4 is a detailed sectional view taken substantially on the line 4—4 of Figure 2.

Figure 5 is a detailed sectional view taken substantially on the line 5—5 of Figure 1.

Figure 6 is a fragmentary view in perspective of the lower end portion of one of the tools.

As illustrated in Figures 1 to 6 in the accompanying drawing, 1 denotes a suitably formed head provided at its central part with an outstanding socket member 2 in which is fitted a handle member 3 of desired material. This handle member 3 is preferably of a material that will withstand impacts imposed thereupon by a hammer or peen.

The head 1 carries the spaced legs 4 and 5 arranged in parallelism and extending in a direction opposite to that of the socket member 2. The leg 5 is of a length less than that of the leg 4 and the leg 4 is tubular to receive the shank 6 of an elongated tool 7. The outer end of this tool is provided with a fishtail foot 8. The outer wall of the leg 5 or that portion of the wall of the leg remote from the leg 4 is provided with a slot 9 open at the outer or free end of the leg 5. This slot 9 allows for swinging movement within the leg through the slot 9 of a shank 10 of a second tool 11. The outer end of this tool 11 is also provided with a fishtail foot 12.

When the shank 10 is in a position within the leg 5, the inner end of said shank 10 is closely adjacent to the shoulder 14 afforded by the inner end of the slot 9 so that upon impact being imposed upon the handle 3, the two tools 7 and 11 will be forced down into the ground with the tools 7 and 11 at opposite sides of the dandelion or kindred weed to be lifted.

In connection with lawns sodded with Bermuda grass and the like, it is very difficult to dig down through the turf and it is for this reason that it is necessary to provide means whereby the tools 7 and 11 may be properly driven through the turf in order to obtain the desired hold upon the root of the plant and which hold or grip should preferably be about nine inches below the ground surface.

Interposed between the legs 4 and 5 is a turnbuckle T. One of the threaded members 15 of the turnbuckle T is operatively connected, as at 16, to the leg 4 and the second threaded member is freely disposed in the lower or outer end portion of the leg 5 and operatively connected, as at 17, to the upper portion of the shank 10 for the tool 11. After the tools 7 and 11 have been driven down through the sod and into the ground at opposite sides of the dandelion or other weed, the nut 18 of the turnbuckle is turned by the operating handle 19, or otherwise as may be preferred, in a direction to force the tool 11 toward the tool 7 so that the feet 8 and 12 will be brought into tight contact with the root of the weed so that when pull is imposed upon the lifter, the weed will be withdrawn from the ground, together with a considerable portion of its root.

In many instances, the dandelion or kindred weed cannot be withdrawn by manual pull. Under such conditions a jack B is applied to the leg 4. This leg 4 is provided with opposite slots 20 whereby a ratchet part 21 of the jack may be locked by a pin a to the shank 6 for movement therewith. The lower portion of the leg 4 freely carries a second part 22 of the jack B including the pawls 23 and the operating lever 24. Upon oscillation of the lever 24 the pawls 23 will have such coaction with the ratchet part 21 of the part 22 to effectively force the shank 6, which will effectively force the device upwardly sufficient to break loose the weed after which the weed, together with the bulb can be manually pulled out of the ground.

When the jack is used it is believed to be apparent that the part 22 will have direct contact upon the ground surface. When the jack B is not desired to be used, it can be readily removed.

The shorter leg 5 is provided at the inner portion of the slot 9 with an elongated opening 25 through which passes the threaded member 15 of the turn buckle T which is operatively connected to the shank 10 of the tool 11. While the turn buckle T provides means for effecting the desired swinging movement of the tool 11, it is also to be noted that it serves to hold the tool 11 in proper assembled relation with respect to the leg 5.

The tool 11, outwardly of the leg 5 but in close proximity thereto, is provided with the inwardly disposed arm 26 which is pivotally connected, as at 27, to the second arm 28 carried by and extending inwardly from the outer end portion of the leg 4. These arms 26 and 28 through the pivotal connection 27 provide the desired swinging mounting for the tool 11.

From the foregoing description it is thought to be obvious that a lifter for weeds constructed in accordance with my invention is particularly well adapted for use by reason of the convenience and facility with which it may be assembled and operated.

I claim:

1. A weed lifter comprising a head, a pair of legs carried by the head, elongated ground penetrating tools carried by the legs, means for pivotally mounting one of said tools for swinging movement toward or from the other, and pressure means for moving the outer end portion of the swinging tool toward the outer end portion of the second tool, the leg having the swinging tool being slotted to receive the inner portion of the tool when said swinging tool is retracted.

2. A weed lifter comprising a head, a pair of legs carried by the head, elongated ground penetrating tools carried by the legs, means for pivotally mounting one of said tools for swinging movement toward or from the other, the leg having the swinging tool being slotted to receive the inner portion of the tool when said swinging tool is retracted, and pressure means operatively engaged with and interposed between the second leg and the swinging tool for moving the outer end portion of the swinging tool toward the outer end portion of the second tool.

3. A weed lifter comprising a head, a pair of legs carried by the head, elongated ground penetrating tools carried by the legs, means for pivotally mounting one of said tools for swinging movement toward or from the other, and pressure means for moving the outer end portion of the swinging tool toward the outer end portion of the second tool, the leg having the swinging tool being slotted to receive the inner portion of the tool when said swinging tool is retracted, the leg having the slot being shorter than the other leg and the pivotal mounting for the swinging tool being outwardly of the shorter leg.

4. A weed lifter comprising a head, a pair of legs carried by the head, elongated ground penetrating tools carried by the legs, means for pivotally mounting one of said tools for swinging movement toward or from the other, the leg having the swinging tool being slotted to receive the inner portion of the tool when said swinging tool is retracted, the pivotal mounting for the swinging tool being outwardly of the associated leg, and a turn buckle interposed between the legs, one of the threaded members of the turn buckle being pivotally connected to the inner portion of the swinging tool and the second threaded member of the turn buckle being pivotally connected to the second leg, the slotted leg having an opening through which the first named threaded member of the turn buckle passes, said turn buckle providing means for moving the outer end portion of the swinging tool toward the outer end portion of the second tool.

5. A weed lifter comprising a head, a pair of legs carried by the head, elongated ground penetrating tools carried by the legs, one of said legs being shorter than the other, said shorter leg being slotted to allow for swinging movement of the tool associated with said shorter leg, an inwardly disposed arm carried by said last name tool outwardly of the shorter leg, an inwardly disposed arm carried by the outer portion of the second leg, means for pivotally connecting said arms, and means coacting with the inner portion of the swinging tool and the second leg for moving the outer end portion of the swinging tool toward the outer end portion of the second tool.

6. A weed lifter comprising a head, a pair of legs carried by the head, elongated ground penetrating tools carried by the leg, means for pivotally mounting one of said tools for swinging movement toward or from the other, means for moving the outer end portion of the swinging tool toward the outer end portion of the second tool, and means associated with one of the legs for coaction with the ground to lift the head and legs together with the plant held between the tools.

ROBERT A. THOMPSON.